US009639565B2

(12) United States Patent
Biswas

(10) Patent No.: US 9,639,565 B2
(45) Date of Patent: May 2, 2017

(54) TRANSACTION SUPPORT USING INTRUSIVE HASH TABLES

(71) Applicant: Shubhra Sankar Biswas, Oak Park, IL (US)

(72) Inventor: Shubhra Sankar Biswas, Oak Park, IL (US)

(73) Assignee: SAP SE, Walldorf (DE)

( * ) Notice: Subject to any disclaimer, the term of this patent is extended or adjusted under 35 U.S.C. 154(b) by 147 days.

(21) Appl. No.: 14/476,941

(22) Filed: Sep. 4, 2014

(65) Prior Publication Data

US 2016/0070700 A1   Mar. 10, 2016

(51) Int. Cl.
*G06F 17/30* (2006.01)

(52) U.S. Cl.
CPC .... *G06F 17/3033* (2013.01); *G06F 17/30371* (2013.01)

(58) Field of Classification Search
CPC ........... G06F 17/3033; G06F 17/30949; G06F 17/30628; G06F 9/466
See application file for complete search history.

(56) References Cited

U.S. PATENT DOCUMENTS

2004/0039962 A1* 2/2004 Ganesh ............... G06F 11/1474
                                                     714/16
2006/0212492 A1* 9/2006 Jacobs ............... G06F 17/30551

* cited by examiner

*Primary Examiner* — Robert Beausoliel, Jr.
*Assistant Examiner* — Hau H Hoang
(74) *Attorney, Agent, or Firm* — Sterne, Kessler, Goldstein & Fox P.L.L.C.

(57) ABSTRACT

Disclosed herein are system, method, and computer program product embodiments for utilizing an intrusive data hash table to support processing transactions. An embodiment operates by receiving a transaction comprising a plurality of operations. Responsive to the receiving, the transaction is verified by verifying the validity of the plurality of operations. Responsive to verifying the transaction, the transaction is applied to the intrusive hash table.

16 Claims, 12 Drawing Sheets

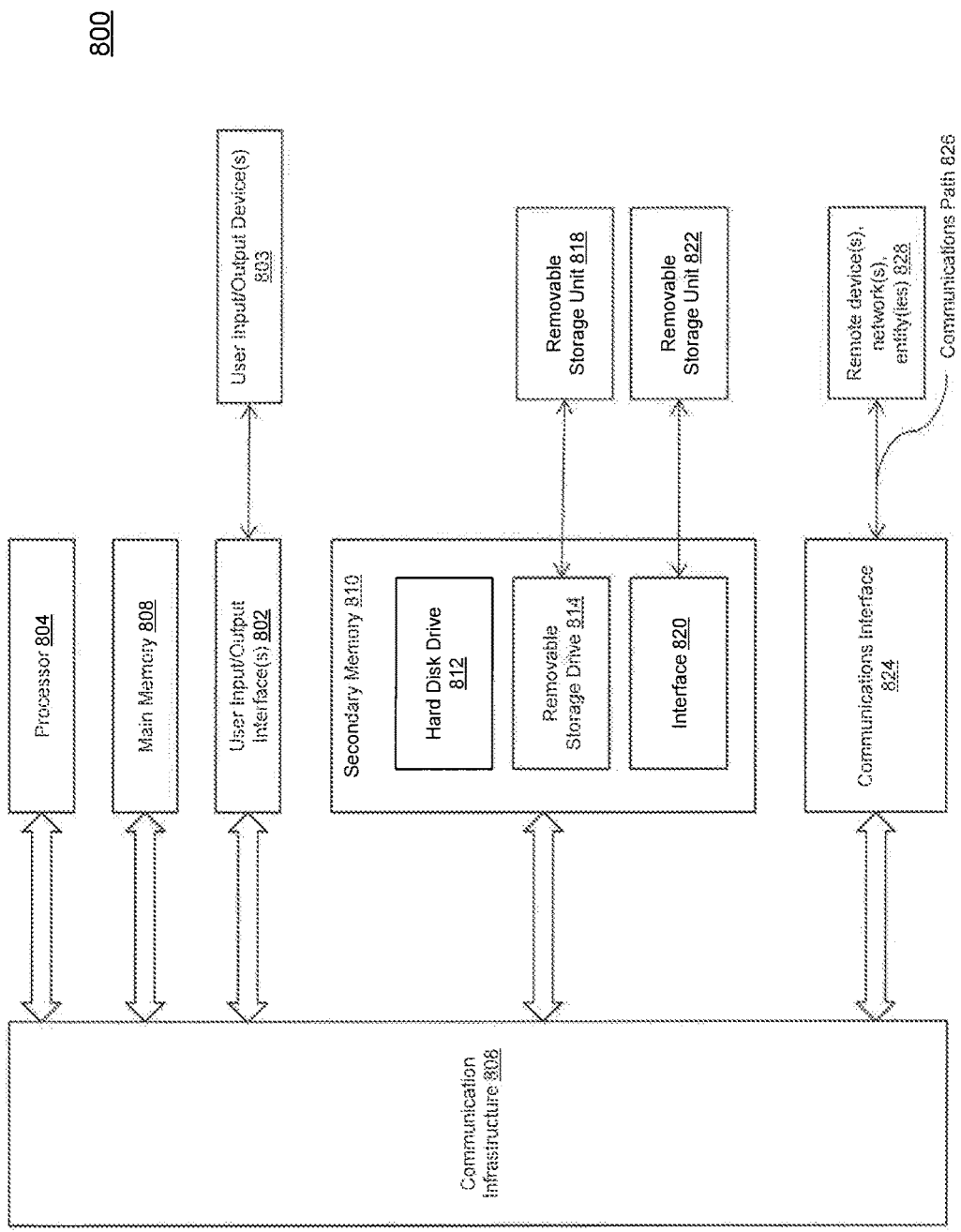

TRANSACTION SUPPORT USING INTRUSIVE HASH TABLES

BACKGROUND

Commercial database systems need the capability to process transactions. Processing transactions often include verifying the transactions and applying the changes in the transactions atomically. These requirements may lead to a decrease in event throughput and an increase in latency. In addition, verifying correctness often requires caching intermediate lookup values, which may result in additional memory usage.

BRIEF DESCRIPTION OF THE DRAWINGS

The accompanying drawings are incorporated herein and form a part of the specification.

FIG. 8 is an example computer system useful for implementing various embodiments.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for utilizing an intrusive data structure such as an intrusive hash table to support processing transactions. For example, embodiments may allow a data management system to verify transaction blocks for correctness and apply changes, such as data operations, in those blocks atomically with minimal performance and memory overheads. In other embodiments, operations in a transaction block may be collapsed prior to applying changes to further improve performance. In further embodiments, the intrusive data structure and verification/application mechanisms described herein may be utilized to build indexing structures in database systems.

Figure 1:
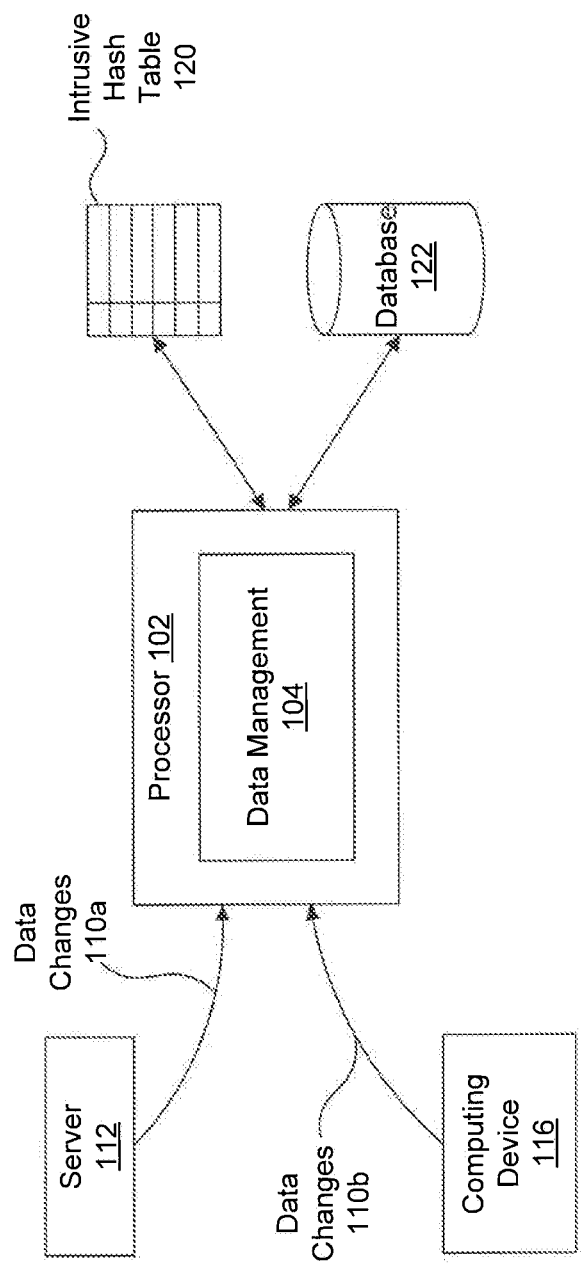
FIG. 1 is a block diagram of a database system that includes a data management module to implement transaction support using an intrusive hash table, according to an example embodiment.

FIG. 1 illustrates a data management system 100 according to an example embodiment. Data management system 100 includes processor 102, which may receive data changes 110b from computing device 116 and/or data changes 110a from server 112. In an embodiment, processor 102 enables distributed and parallel processing and may for example be employed in event stream processing (ESP) or complex event processing (CEP). Computing device 116 may be any of a number of devices, including sensors, laptop computers, and mobile devices like smartphones. Server 112 may be software, suitable hardware, or a combination of software and hardware that responds to other computers and devices in a network.

Data changes 110 may be submitted in the form of operations. An operation may comprise a key and an opcode specifying the type of operation to be performed on the key. Additionally, an opcode data value may be associated with the opcode. In an embodiment, the operation may be an INSERT (INS), UPDATE (UPD), DELETE (DEL), or NO-OP (NONE) operation. However, additional operations such as CLEAR and FIND as well as others used in database systems may also be encoded in other embodiments.

The operations may be grouped as transactions. A transaction may comprise a sequence of operations that may be performed as a single logical unit of work. In an embodiment, a transaction having an atomic property guarantees either all the operations within the transaction are successfully performed or none of them are performed. The transaction is committed to database 122 upon verifying the validity of performing the operations in that transaction. Database 122 may be a relational database, in an example embodiment.

Data management module 104 within processor 102 may receive data changes 110 in the form of transactional operations from devices such as computing device 116 and server 112. In an embodiment, data management module 104 may apply a transaction to database 122 upon verifying the transaction's validity through a two pass process. In a first pass, data management module 104 may verify the transaction's correctness through intrusive hash table 120, defined below. In a second pass, after verifying the transaction, operations in that transaction may be applied to intrusive hash table 120.

By using an intrusive hash table 120 and a verifying mechanism, data management system 100 may increase event throughput and decrease latency while processing transactions. In another embodiment, data management module 104 may collapse operations of the transaction in intrusive hash table 120 as part of the first pass during transaction verification to further decrease latency.

Hash tables are commonly utilized in database management systems due to their amortized search, insert, and delete operations. However, in embodiments, the data structure used for verifying transaction blocks need not be a hash table. In some embodiments, the data structure may be any data structure commonly used in database systems, such as B-trees or R-trees, depending on the nature of the stored data and the user's intended use.

A non-intrusive data structure stores copies of values in data objects passed by users. In contrast, an intrusive data structure such as an intrusive hash table stores the passed data objects themselves. Operating on data objects themselves as opposed to copies of objects provides many advantages. For example, in an embodiment, intrusive data structures do not invoke memory management to maintain data copies, therefore time and space overheads associated with dynamic memory management may be minimized.

However, additional data may be needed to maintain an original data object in the intrusive data structure.

Figure 2A:
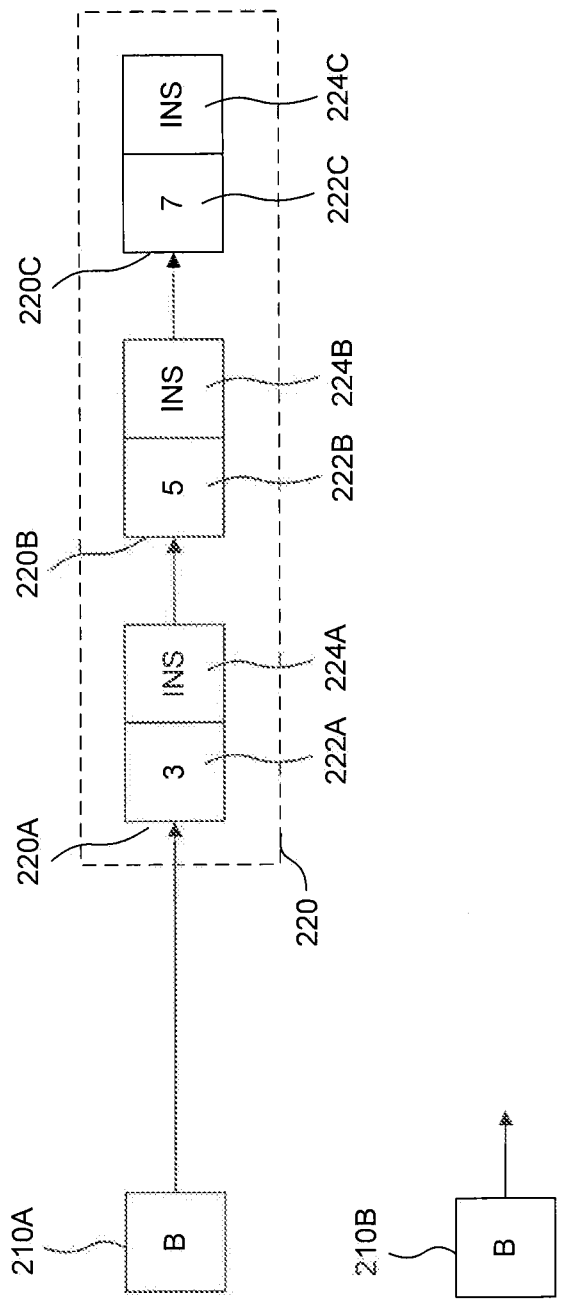
FIG. 2A illustrates an intrusive hash table, according to an example embodiment.

FIG. 2A illustrates an example embodiment of an intrusive hash table 200A having nodes 220, each of which may contain a unique key 222 and an operation 224. In other embodiments, nodes 220 may contain additional members, such as a member to carry a payload. Generally, a hash table, including an intrusive hash table, is a data structure implementing an associative array where unique keys are mapped to values. For example, in the embodiment depicted in FIG. 2A, unique key 222A (3) is mapped to an operation 224A (INS) in node 220A.

In an embodiment, given a key, the hash table may use a hash function to compute an index value that specifies a particular bucket of a plurality of buckets 210, from which the key and an associated operation can be located. In this example, key 5 was indexed into bucket 210A, from which the node 220B, containing key 5 and an INSERT operation, can be located. The intrusive hash table 200A may use any mechanism, such as an array or linked list of buckets, for maintaining the buckets 210.

Hash collisions occur when the hash function computes the same index for two unique keys. For example, in the example of FIG. 2A, the hash function in intrusive hash table 220A computed the same index for keys 3, 5, and 7. Therefore, all these keys are associated with the same bucket 210A. In an embodiment, hash collisions may be resolved by having each bucket maintain an independent linked list of nodes. In FIG. 2A, bucket 210A points to a linked list of nodes 220 to maintain unique keys that are indexed into bucket 210A. No keys have been indexed into bucket 210B, so bucket 210B points to an empty linked list.

Due to the intrusive property of intrusive hash table 120, additional data may need to be maintained. For example, node 220A with key value 3 and an INSERT operation, may need a next pointer member, which points to node 220B in FIG. 2A.

Figure 2B:
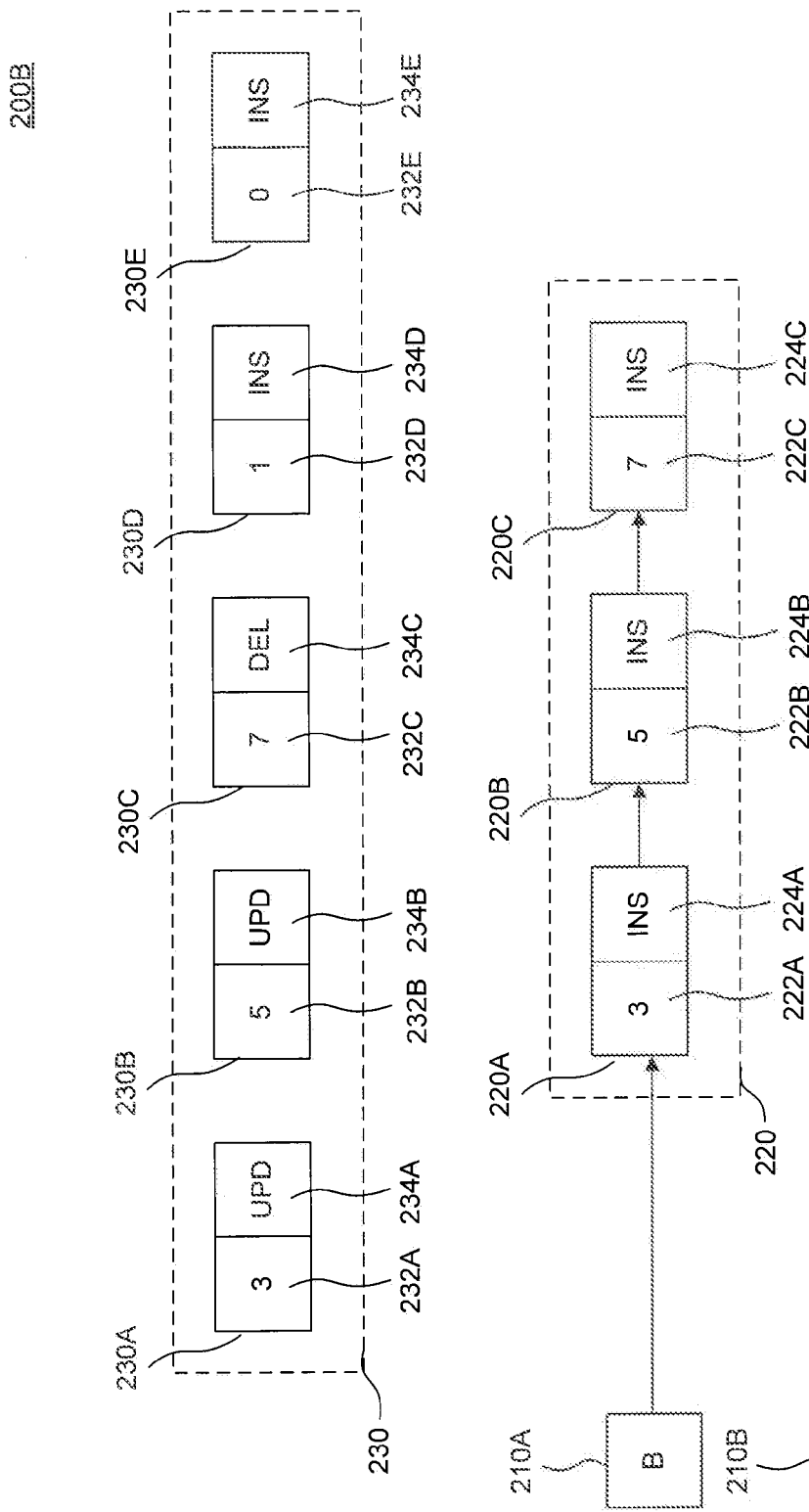
FIGS. 2B-D illustrate example embodiments of verifying and collapsing transaction operations as part of a first pass in a two-pass process, according to an example embodiment.
Figure 2C:
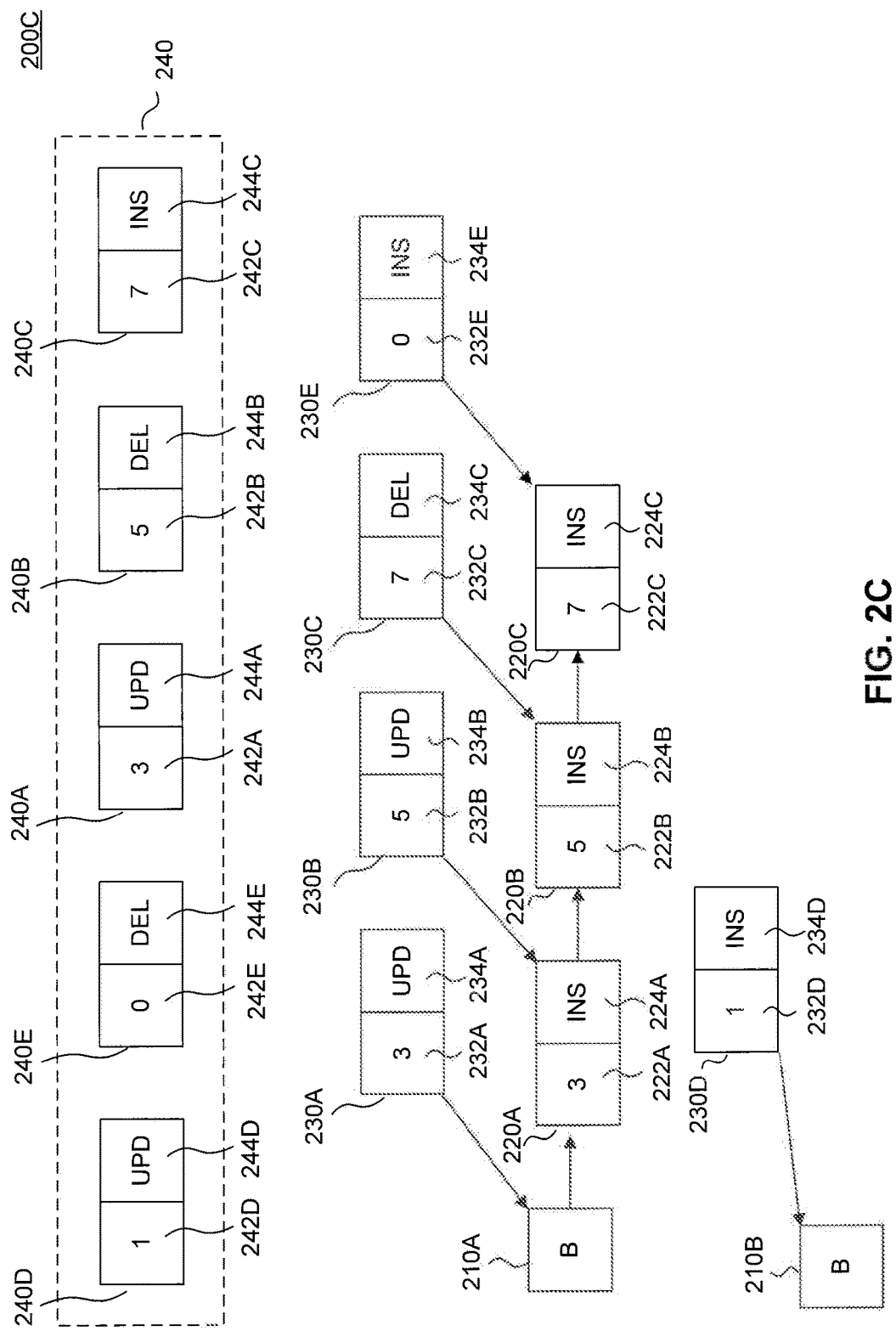

FIGS. 2B-C illustrate example embodiments of data management module 104 using intrusive hash table 120 to verify transactions received as data changes 110 from computing device 116 and/or server 112 during the first pass. In addition to intrusive hash table 200A, FIG. 2B illustrates a sequence of operations represented as nodes 230 that may be processed transactionally.

According to an embodiment, there are at least three basic types of errors that may be detected while verifying a sequence of operations in a transaction. First, an INSERT (INS) operation on a key is not allowed if the key already exists. Second, an UPDATE (UPD) operation on a key is not allowed if the key does not already exist. Thirdly, a DELETE (DEL) operation on a key is also not allowed if the key does not already exist. In an embodiment, detecting errors may involve searching both intrusive hash table 120 and previous operations in the transaction. For example, an operation corresponding to a node containing a key 2 and INSERT operation may still result in an error even if key 2 was not found in intrusive hash table 120 if an earlier processed operation of the transaction corresponds to a node containing a key 2 and another INSERT operation. Likewise, an operation corresponding to a node containing a key 2 and DELETE operation may be verified as a valid operation even if key 2 was not found in intrusive hash table 120 if an earlier processed operation of the transaction corresponds to a node containing a key 2 and INSERT operation. In this case, a DELETE operation may be allowed because the key has been inserted in a previous operation of the transaction. Generally, a hash table is used because the hash table enables an amortized constant lookup time to search for whether a particular key already exists, which may reduce latency time while verifying operations.

FIG. 2C illustrates verifying a transaction including nodes 230 in FIG. 2B. For example, node 230A containing a key 232A (3) and operation 234A (UPD) was verified because key 232A (3) was located in the intrusive hash table in FIG. 2B at key 222A (3) in node 220A associated with operation 224A (INS). Had the operation member 234A of node 230A been an INSERT operation, data management module 104 may have instead detected an error because an INSERT operation cannot be performed on an existing key. As part of the first pass step, upon verification, node 230A in FIG. 2B may be configured to route its next pointer member to point to the parent of the node having the same key detected in the intrusive hash table of FIG. 2B, depicted as 230A containing a next pointer member pointing to block 210A in FIG. 2C. The parent of a child node is an element whose next pointer member points to the child node. In the previous example, the parent of node 220A is block 210A.

In the case where an existing key is not detected, such as for key 232E (0) in node 230E in FIG. 2B, the next pointer may be routed to point to the last element of the bucket in which the key was indexed. Therefore, the next pointer member of node 230E in FIG. 2C points to the last node, node 220C, of the linked list of bucket 210A because the hash function calculated an index associated with bucket 210A using key 232E (0). When a bucket points to an empty linked list, the last element may be the bucket element itself. For example, the hash function using a key 232D (1) of node 230D in FIG. 2B calculates an index associated with bucket 210B, which contains an empty linked list. Therefore, the next pointer member of node 230D in FIG. 2C may be routed to point to bucket 210B. In the case where a key of a current operation being processed is found in a previous operation of the transaction and the current operation is determined to be valid, the next pointer member of the current operation would point to the detected previous operation. Utilizing pointers effectively within intrusive hash table 120 may reduce extra space requirements by avoiding the need to cache lookup results.

In an embodiment, if data management module 104 detects at least one operation of the sequence of operations 230 in a transaction causes an error, then data management module 104 may stop processing other operations in the current transactions and proceed to process another transaction and associated operations without a rollback procedure. Since the underlying data structure of intrusive hash table 200A does not change in FIG. 2C as operations are being verified, no actions may need to be performed to revert the intrusive hash table to its pre-verification state if an error is detected. After the operations 230 of a transaction have been verified as error-free in the first pass, these operations may be applied to the intrusive hash table using the mechanisms of the second pass, illustrated in FIGS. 3A-E.

Figure 2D:
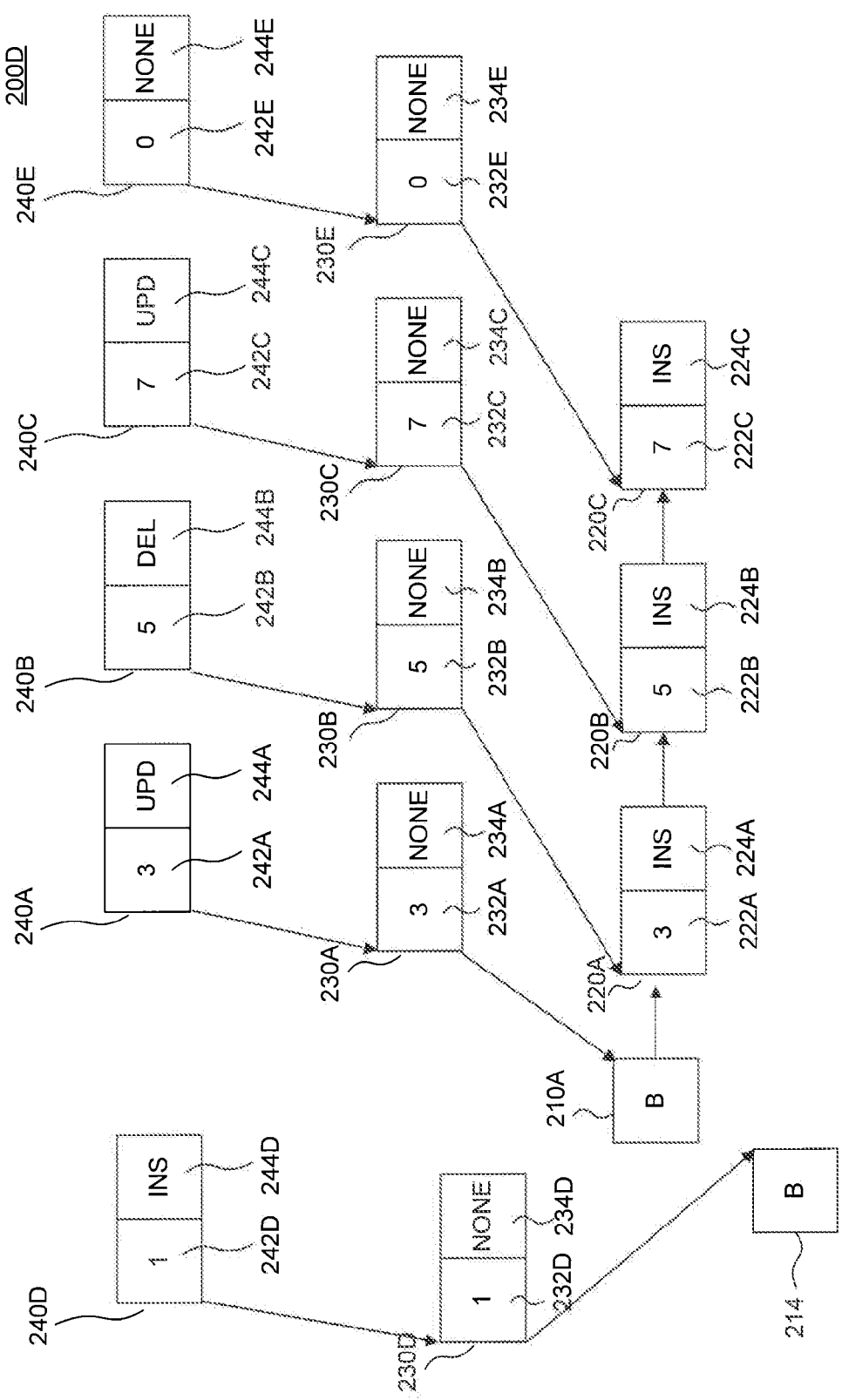

FIGS. 2C-D illustrate data management module 104 using intrusive hash table 120 to verify and collapse operations of a transaction, according to an example embodiment. Collapsing operations may be possible when an operation in a transaction operates on the same key as a previous operation in the same transaction. Merging the operation and the previous operation into equivalent operations may reduce the processing of redundant operations. In an example embodiment, a transaction comprises a sequence of operations including operations 230 from FIG. 2B and operations 240 from FIG. 2C, where operations 230 occur first. The operations 230 from FIG. 2B do not act on the same keys, so collapsing may not be possible. Operations 230 are verified according to the mechanisms described in previous descriptions regarding FIG. 2C. In an embodiment, operations 240 from FIG. 2C are associated with keys that have been previously operated on in previously verified operations 230. Therefore, operations 240 may be collapsed upon verifying the validity of operations 240.

In an embodiment, the mechanisms for verifying the validity of a collapsible operation is similar to those described with regards to FIGS. 2B-C. First, an INSERT (INS) operation on a key is not allowed if the key already exists. The key already exists if the key has been inserted or updated in a most recently verified previous operation, from the same transaction, operating on that key. Second, an UPDATE (UPD) operation on key is not allowed if the key does not already exist. Third, a DELETE (DEL) operation on a key is also not allowed if the key does not already exist. In both the second and third cases, the key may not exist or may no longer exists if the key has been deleted in a most recently verified previous operation, from the same transaction, operating on that key. Similar to the verification process described in FIGS. 2B-C, if a collapsible operations is found to be invalid, data management module 104 may stop verifying the remaining operations of the transaction and proceed to process a subsequent transaction without the need for rollback procedures.

Upon identifying a collapsible operation and verifying the collapsible operation, the next pointer member of the node associated with the collapsible operation may be routed to point to the most recently verified previous operation operating on that same key to allow data management module 104 to apply the collapsible operation upon verifying the other operations of the transaction. FIGS. 2C-D illustrate how the types of collapsing operates, in an embodiment.

For example, for an UPDATE operation 244D on key 242D (1) in node 240D from FIG. 2C and a most recently verified operation operating on the same key 232D (1) with an INSERT operation 234D at node 230D, the UPDATE and INSERT operations are collapsed into equivalent operations in FIG. 2D. Operation 234D of node 230D is modified to contain a NO-OP operation (NONE) in FIG. 2D because the INSERT operation is a redundant operation if the inserted value may be replaced through the subsequent UPDATE operation 244D in FIG. 2C. Operation 244D of node 240D is modified to contain an INSERT operation (INS) in FIG. 2D and the next pointer member of 240D may be routed to point to node 230D. In an embodiment, nodes associated with NONE operations are not processed, which may decrease verification latency and increase processing throughput.

In another example, for a DELETE operation 244E on key 242E (0) in node 240E from FIG. 2C and a most recently verified operation operating on the same key 232E (0) with an INSERT operation 234E at node 230E, the DELETE and INSERT operations are collapsed into NO-OP operations. Operations 234E and 244E are both modified to contain NO-OP operations (NONE) in FIG. 2D because the subsequent DELETE operation 240E in FIG. 2C nullifies the INSERT operation 234E in FIG. 2C. In an embodiment, the next pointer member of 240E may be routed to point to node 230E in FIG. 2D. In another embodiment, the next pointer member of node 240E may not need to be modified because a NO-OP operation may not be processed.

Similarly, an UPDATE operation 234A followed by a subsequent UPDATE operation 244A in FIG. 2C may be collapsed into a NONE operation 234A and the subsequent UPDATE operation 244A in FIG. 2D. An UPDATE operation 234B followed by a subsequent DELETE operation 244B in FIG. 2C may be collapsed into a NONE operation 234B and the subsequent DELETE operation 244B in FIG. 2D. Finally, a DELETE operation 234C followed by a subsequent INSERT operation 244C in FIG. 2C may be collapsed into a NONE operation 234C and an UPDATE operation 244C in FIG. 2D.

Figure 3A:
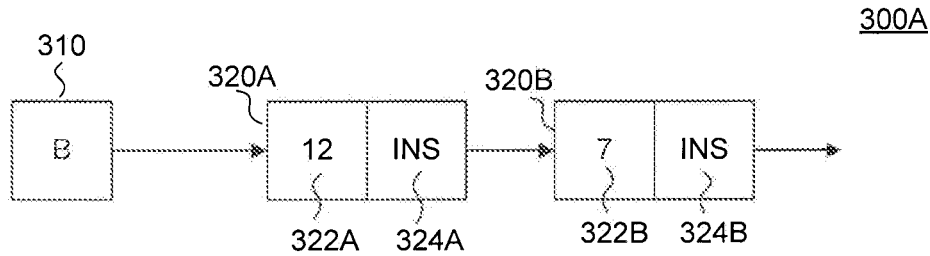
FIGS. 3A-E illustrate example embodiments of applying transaction operations to an intrusive hash table as part of a second pass in a two-pass process, according to an example embodiment.
Figure 3B:
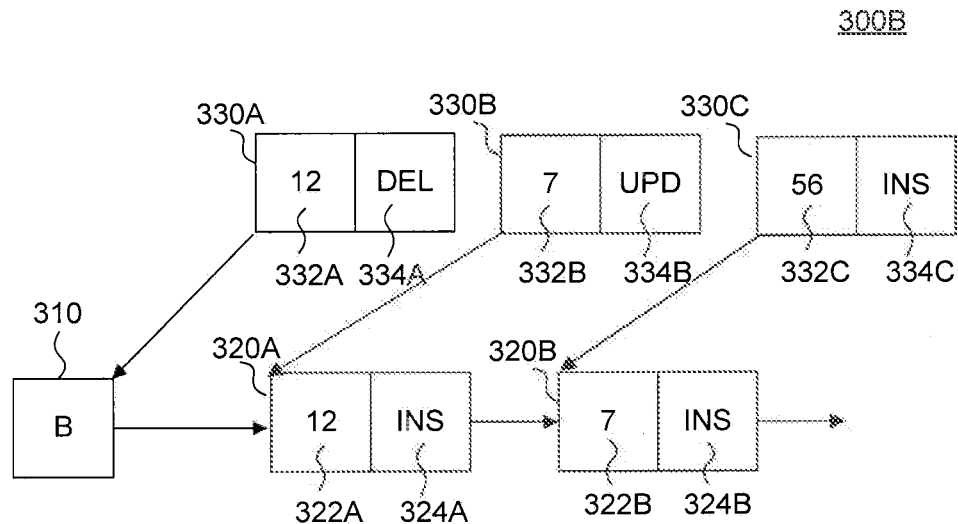
Figure 3C:
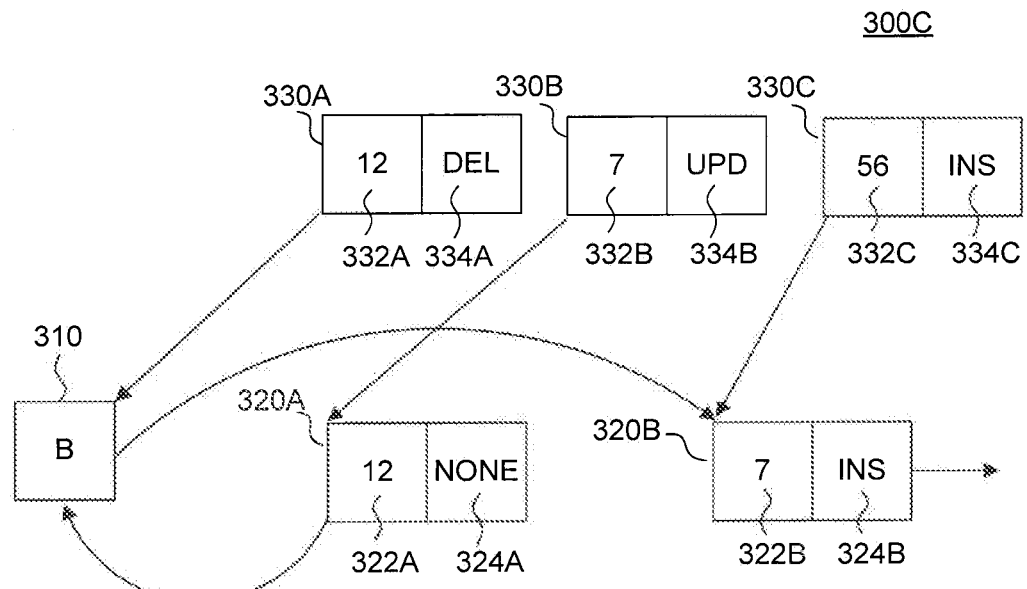
Figure 3D:
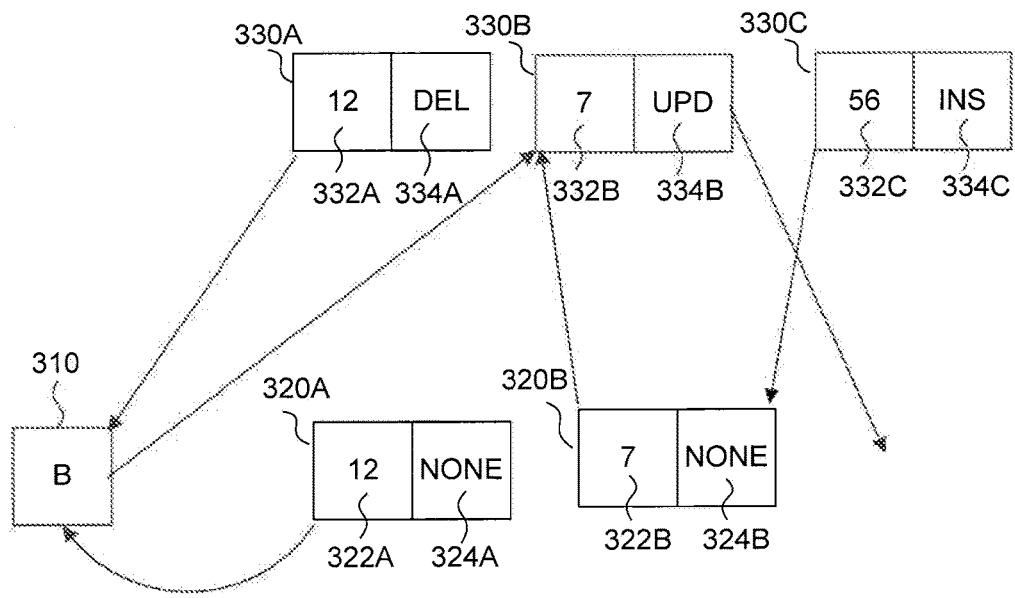
Figure 3E:
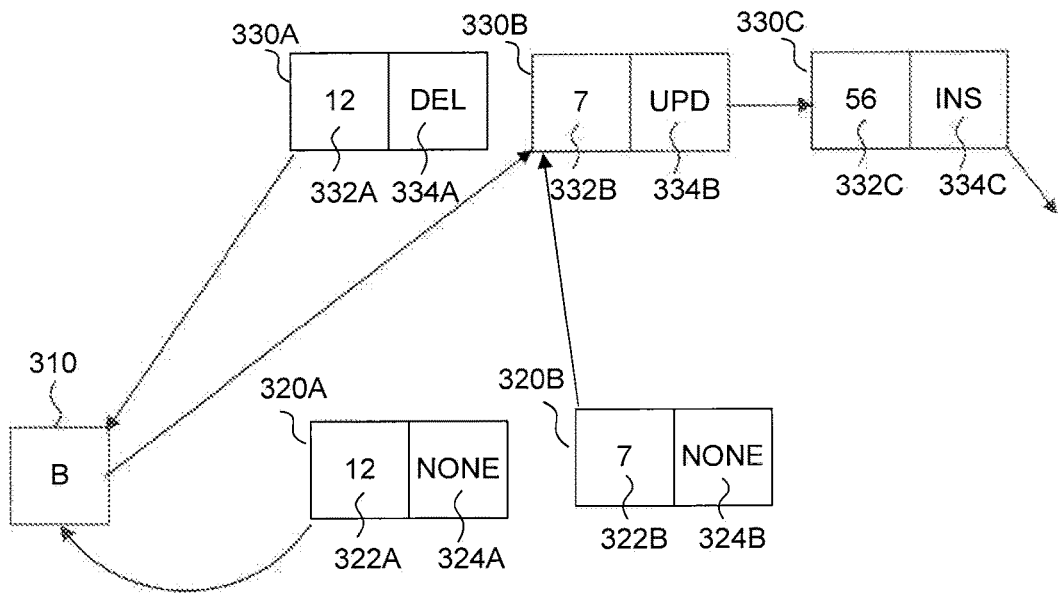

FIGS. 3A-E illustrate verifying and applying the operations of a transaction to intrusive hash table 120, according to an example embodiment. FIG. 3A illustrates an example intrusive hash table containing a block 310 pointing to a linked list of nodes 320, prior to processing a transaction, according to an embodiment. FIG. 3B illustrates the state of intrusive hash table 120 after verifying a transaction including operations associated with nodes 330 containing keys 332 and operations 334 according to the verifying mechanisms described in FIGS. 2A-D. FIGS. 3C-E illustrate how three types of operations, DELETE, UPDATE, and INSERT, may be applied to intrusive hash table 120. The NO-OP operation is not illustrated because in an embodiment, the NO-OP operation may be skipped and may therefore not be applied. In other embodiments, other operations are possible and the mechanism for applying those operations may be variations of the following described procedures.

FIG. 3C illustrates applying the DELETE operation 334A on key 332A in node 330A to intrusive hash table 120, according to an embodiment. In order to effectively delete the existing node 320A associated with the same key 332A (12) from the intrusive hash table, the next pointer member of the effective parent, block 310, of the existing node 320A may be directed to point to the node 320B identified by the next pointer member of the existing node 320A in FIG. 3B. The next pointer members configured in the verifying step in FIG. 3B allow for data management module 104 to easily locate the parent without an additional lookup. The effective parent of existing node 320A in 3B is also the first node identified by next pointer member of node 330A that does not contain a NONE operation. Therefore, the effective parent of node 330A is block 310 because 330A points to block 310 and block 310 is not associated with a NONE operation. In FIG. 3C, the effective parent, block 310, points to 320B, which is the node identified by the existing node 320A in FIG. 3B. Additionally, the operation 324A of the deleted node 320A may be updated to NONE because it has been effectively removed from intrusive hash table 120. Finally, the next pointer member of the deleted node 320A is routed to point to the parent, block 310, of the deleted node. The next pointer member of deleted node 320A is a backlink that may allow subsequent operations of the transaction to be processed correctly.

FIG. 3D illustrates applying the UPDATE operation 334B associated with node 330B in FIG. 3C to intrusive hash table 120, according to an example embodiment. In order to effectively update the existing node 320B associated with the same key 332B (7) from the intrusive hash table in FIG. 3C, the next pointer member of the effective parent of the existing node 320B is directed to point to the node 330B associated with the UPDATE operation 334B in FIG. 3D. The next pointer members configured in the steps in FIGS. 3B-C allow for data management module 104 to easily locate the parent without an additional lookup. From FIG. 3C, the effective parent of existing node 320B is the first node identified by the next pointer members associated with 330B. Therefore, the effective parent of node 330B is not 320A because node 320A contains the NONE operation 324A, but block 310, which is the parent of node 320B in FIG. 3C. In FIG. 3D, the next pointer member of block 310 points to 330B. Additionally, the next pointer member of the node associated with the UPDATE operation 330B in FIG. 3C is configured to point to the node identified by the next pointer member of the node to be updated 320B. In FIG. 3D, node 330B points to null because the node to be updated 320B in FIG. 3C points to null. Similar to applying the DELETE operation, the operation member 324B of the updated node 320B is updated to NONE in FIG. 3D because node 320B has been effectively replaced by node 330B in intrusive hash table 120. Finally, the next pointer member of the updated node 320B is routed to point to the node 330B associated with the UPDATE operation 334B. This backlink may allow subsequent operations of the transaction to be processed correctly.

FIG. 3E illustrates applying the INSERT operation 334C associated with node 330C in FIG. 3D to intrusive hash table 120, according to an embodiment. In order to effectively insert the node 330C, the next pointer member of the inserted node 330C is directed to point to the node identified by the next pointer member of the effective parent of the inserted node 330C and the next pointer member of the effective parent is directed to point to the inserted node 330C. The next pointer members configured in the steps in FIGS. 3B-D allow for data management module 104 to easily locate the effective parent without an additional lookup. From FIG. 3D, the effective parent of inserted node 330C is not 320B because node 320B contains the NONE operation 324B, but node 330B. In FIG. 3E, the next pointer member of node 330C is routed to point to null because the effective parent 330B in FIG. 3D points to null. Additionally, the next pointer member of the effective parent 330B may be routed to point to the inserted node 330C in FIG. 3E. No backlink may be necessary because the INSERT operation 334C associated with node 330C does not affect an existing node in the intrusive hash table in FIG. 3D.

Figure 4:
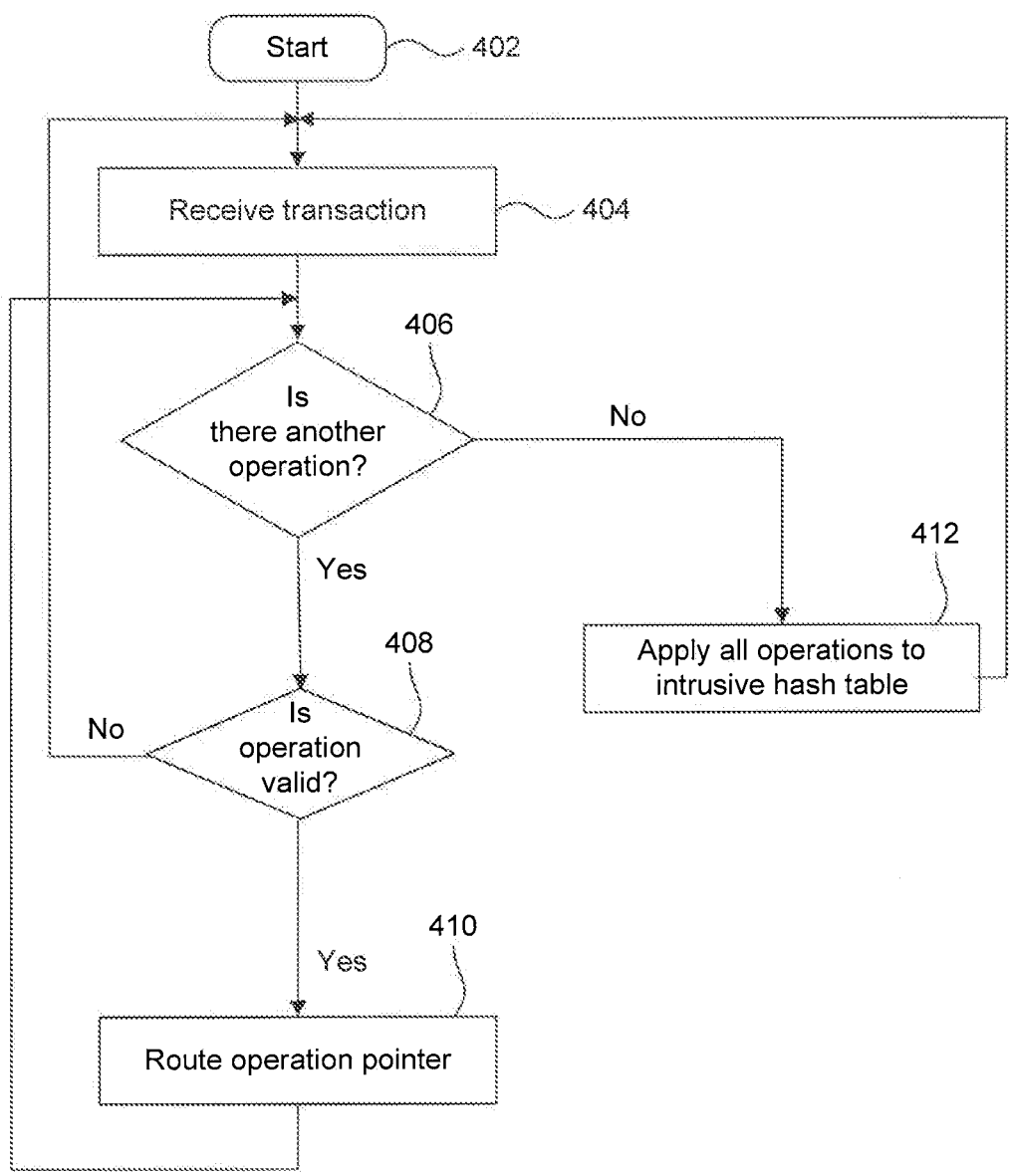
FIG. 4 is a flowchart illustrating steps for processing transaction operations, according to an example embodiment.

FIG. 4 is a flowchart for a method 400 starting at step 402 for processing operations transactionally, according to an embodiment. Method 400 is discussed with continued reference to FIGS. 1-3. Steps 406-410 comprise the first pass where operations of a transaction may be verified. Step 412 comprise the second pass where operations of a transaction may be applied upon verification. Method 400 may be performed by processing logic that can comprise hardware (e.g., circuitry, dedicated logic, programmable logic, microcode, etc.), software (e.g., instructions run on a processing device), or a combination thereof.

In step 404, data management module 104 may receive or wait to receive a transaction comprising a sequence of operations associated with data changes 110 from clients like computing device 116 and server 112.

In step 406, data management module 104 may determine if there is a subsequent operation of the sequence of operations in the transaction that has not been processed.

In step 408, upon determining there exists a subsequent operation, data management module 104 may determine whether the subsequent operation is valid through the use of intrusive hash table 120 according to the example verification mechanisms described in FIGS. 2A-C. By using intrusive hash table 120 and pointer manipulations, data management module 104 may avoid caching lookup results, which may reduce space overheads.

If data management module 104 determines the subsequent operation is invalid in step 408, data management module 104 may stop processing the remaining operations of the transaction and return to step 404, where data management module 104 may receive or wait to receive another transaction. By using intrusive hash table 120 and pointer manipulations, as described in FIGS. 2A-C, no rollback procedures may be needed to revert the intrusive hash table to a pre-transaction verification state when an operation is determined to be invalid.

In step 410, upon determining the operation is valid and error-free, data management module 104 may route the next pointer member of the node corresponding to the operation to point to a corresponding node in intrusive hash table 120 according for example to the verification mechanism described in FIGS. 2A-C.

In step 412, upon determining there is not a subsequent unprocessed operation in the transaction in step 406, data management module 104 may apply the operations of the transaction to intrusive hash table 120 according to the example transaction applying mechanism described in FIGS. 3A-E. By using intrusive hash table 120 and pointer manipulations, as described in FIGS. 3A-D, no additional lookups may be necessary to modify the transaction after establishing transactional correctness because the use of pointers effectively caches the lookup result. Responsive to applying the operations of the transaction, data management module 104 returns to step 404, where data management module 104 may receive or wait to receive a subsequent transaction.

Figure 5:
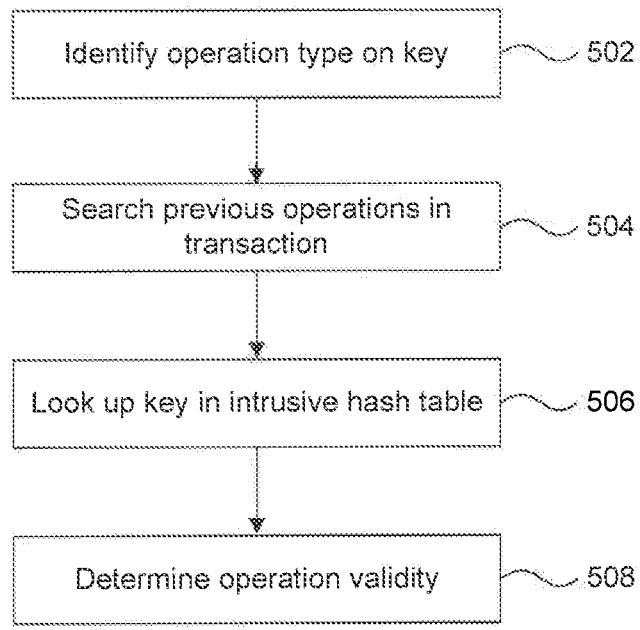
FIG. 5 is a flow chart illustrating steps for verifying operations of transactions as part of a first pass in a two-pass process, according to an example embodiment.

FIG. 5 is a flowchart illustrating a method 500 for verifying the validity of an operation and associated node in step 408 of FIG. 4 in greater detail, according to an example embodiment. The steps of method 500 may not necessarily be performed in the order specified. For example, step 506 may be performed before step 504 in an embodiment. Method 500 is discussed with continued reference to FIGS. 1-2. Method 500 can be performed by processing logic that can comprise hardware (e.g., circuitry, dedicated logic, programmable logic, microcode, etc.), software (e.g., instructions run on a processing device), or a combination thereof.

In step 502, data management module 104 may identify the operation type and the key on which to be operated from the operation and associated node. For example, assuming the current operation to be verified is an operation associated with node 240D in FIG. 2C, data management module 104 determines an operation type 244D (DEL) on a key 242D (5).

In step 504, data management module 104 searches previous operations in the transaction for a key corresponding to the key associated with the current operation. For example, for a current operation associated with node 240D, data management module 104 searches previous operations operating on a key 5.

In step 506, data management module 104 looks up the key associated with the current operation in intrusive hash table 120. For example, data management module 104 looks up key 242D (5) from FIG. 2C in the intrusive hash table in FIG. 2C.

In step 508, data management module 104 may verify the current operation's validity according to the example verification mechanisms described in FIGS. 2A-C. For example, while verifying a current operation associated with node 240D in FIG. 2C, data management module 104 may have located key 242D (5) in the intrusive hash table of FIG. 2C at key 222B (5) in node 220B and found key 232B (5) in node 230B associated with a previous operation. Since the most recent previous operation operating on the same key, an UPDATE operation 234B, is not a DELETE operation, the node 240D may be verified as containing a valid operation on a valid key. Had operation 234B been a DELETE operation, data management module 104 may fail the verification of node 240D and generate an error because a DELETE operation may not be performed on a deleted or nonexistent key.

Figure 6:
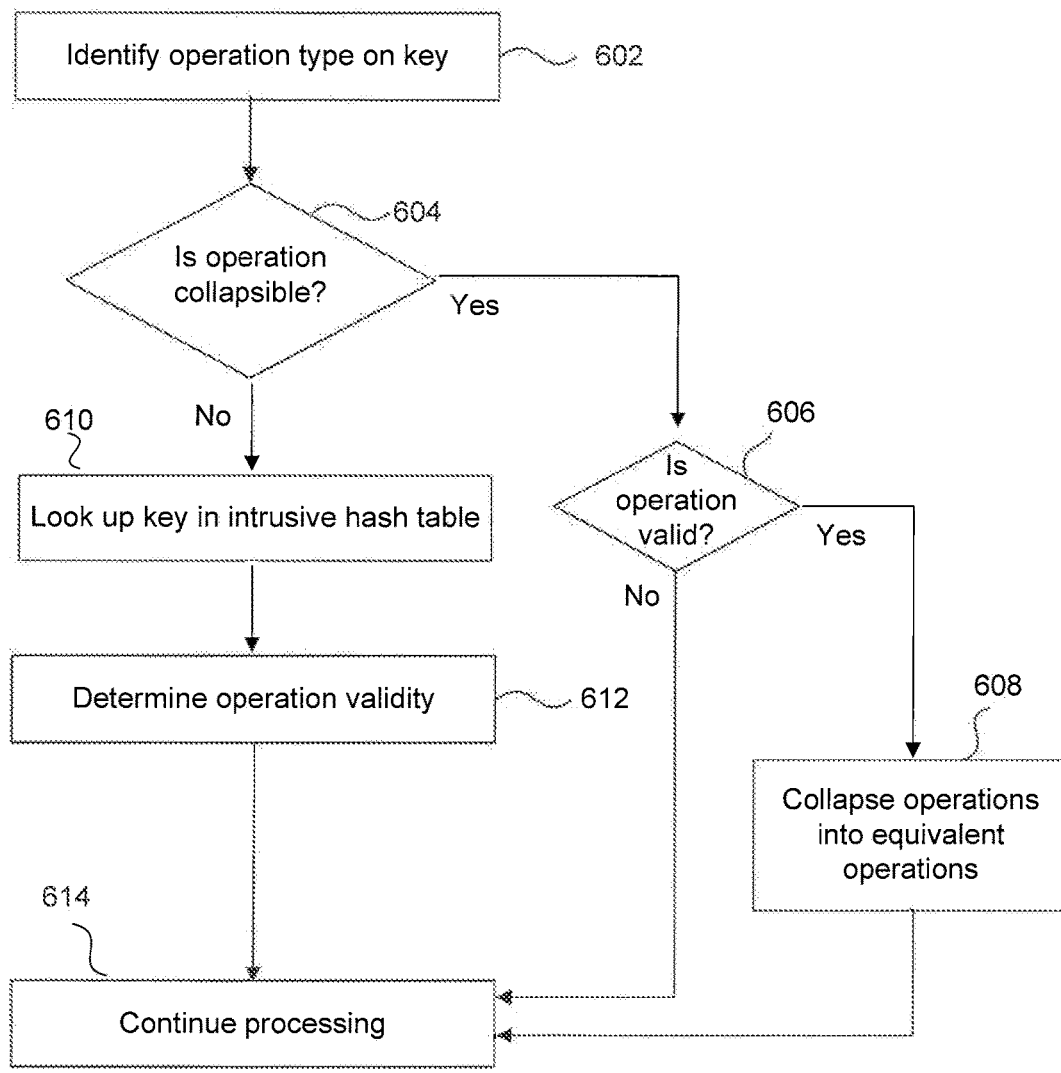
FIG. 6 is a flow chart illustrating steps for verifying and collapsing operations of transactions as part of a first pass in a two-pass process, according to an example embodiment.

FIG. 6 is a flowchart illustrating a method 600 for verifying the validity of an operation of a sequence of operations in a transaction in step 408 in greater detail, where the verifying may include collapsing the operation with other operations being performed on the same key, according to an example embodiment. The steps of method 600 may not necessarily be performed in the order specified. Additionally, method 600 is discussed with continued reference to FIGS. 1-2. Method 600 can be performed by processing logic that can comprise hardware (e.g., circuitry, dedicated logic, programmable logic, microcode, etc.), software (e.g., instructions run on a processing device), or a combination thereof.

In step 602, data management module 104 may identify the operation type and the key on which to be operated from the operation and associated node. For example, assuming the current operation to be verified is an operation associated with node 240D in FIG. 2C, data management module 104 determines an operation type 244D (DEL) on a key 242D (5).

In step 604, data management module 104 may identify whether the current operation to be verified is a collapsible operation by searching for a most recently verified operation of the transaction that operated on the same key. For example, data management module 104 searches for and locates a previously verified operation associated with node 230B in FIG. 2C, which operates on the same key 232B (5) as the key 242D (5) associated with the current node 240D to be verified. Therefore, data management module 104 may identify the current operation associated with node 240D as a collapsible operation. In another embodiment, instead of searching previous operations, data management module 104 may look up key 232B (5) in a separate hash table that maintains previous operations of the transaction that have been verified.

Upon determining a current operation is a collapsible operation in step 604, data management module 104 may determine whether the current operation is valid in step 606 based on the operation type identified in step 602 and the most recently verified operation located in step 604. Example mechanisms for performing these functions are described in FIG. 2D.

Upon determining the current operation is valid in step 606, data management module 104 may collapse the current operation and the most recently verified operation into equivalent operations in step 608 according for example to the mechanisms described in FIG. 2D.

In step 610, upon determining the current operation is not collapsible, data management module 104 may look up the key associated with the current operation in intrusive hash table 120.

In step 612, data management module 104 may determine the validity of the current operation based on the operation type identified in step 602 and whether the key associated with the current operation is located in step 610. Example mechanisms are described in FIGS. 2A-D.

In step 614, data management module 104 has determined the validity of the current operation and may proceed to process the transaction according to steps in method 400. In an embodiment, upon positively verifying the validity of the current operation in method 600, data management module 104 may proceed to step 410 in FIG. 4, in another embodiment, upon failing to verify the validity of the current operation in method 600, data management module 104 may proceed to step 404 in FIG. 4.

Figure 7:
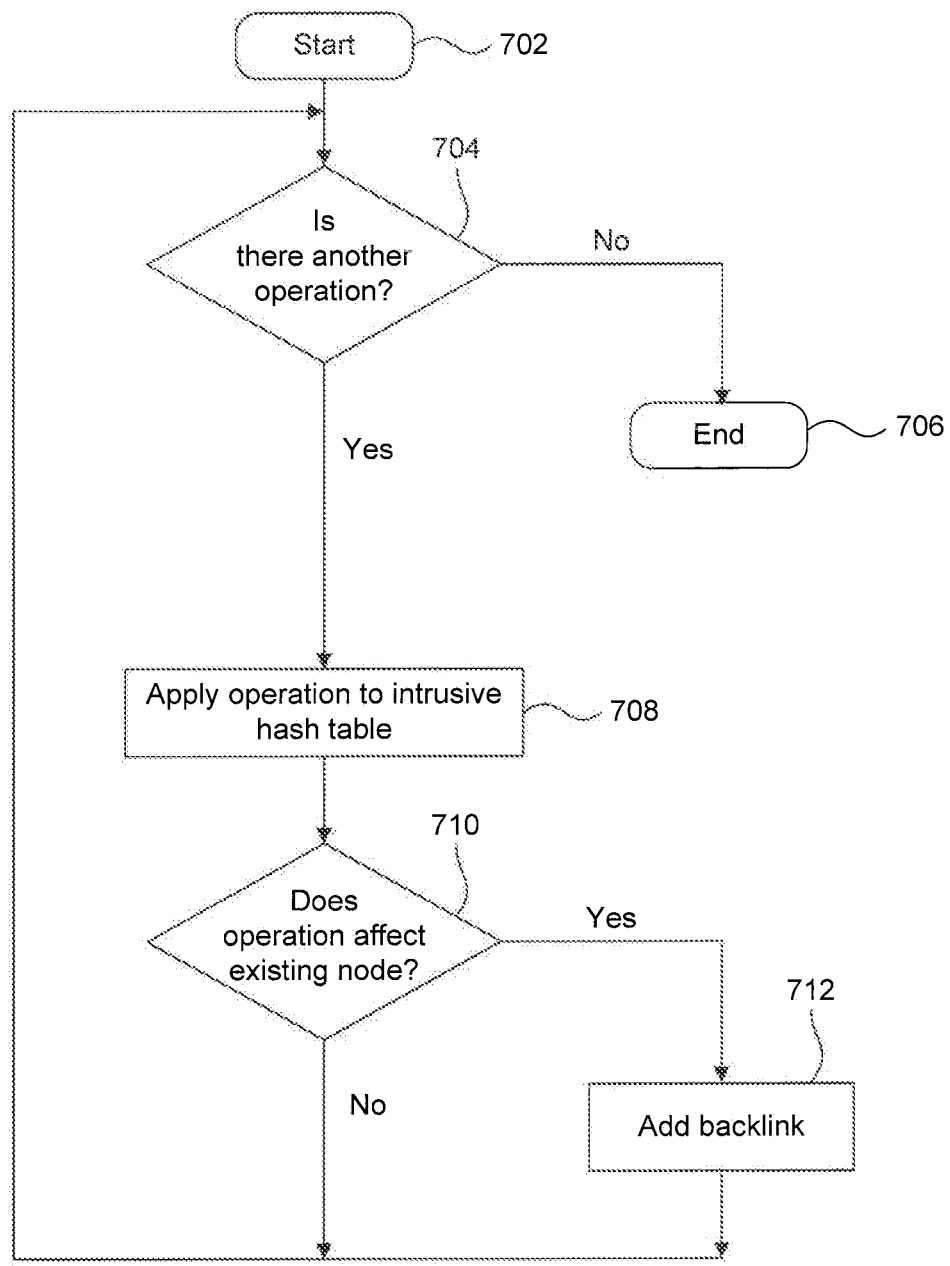
FIG. 7 is a flow chart illustrating steps for applying operations of transactions as part of a second pass in a two-pass process, according to an example embodiment.

FIG. 7 is a flow chart for a method 700 starting at step 702 for illustrating the step 412 in method 400 for applying the operations of a transaction upon verifying the transaction as part of the second pass in the two-pass process in greater detail, according to an example embodiment. Method 700 may be performed by processing logic that can comprise hardware (e.g., circuitry, dedicated logic, programmable logic, microcode, etc.), software (e.g., instructions run on a processing device), or a combination thereof.

In step 704, data management module 104 may determine whether there is another operation in the transaction that has not been applied to intrusive hash table 120. In an embodiment, data management module 104 may skip operations associated with nodes that contain a NONE or NO-OP operator because these operators do not effect database 122. Skipping NO-OP operators may reduce latency involved in processing operations transactionally.

In step 708, data management module 104 may apply the operation to intrusive hash table 120 according for example to mechanisms described in FIGS. 3A-E. No additional lookups may be needed to determine the location to apply the operation because routing the next pointer member of the operation during the verification steps of method 400 effectively caches where to apply the operation.

In step 710, data management module 104 may determine whether the operation would remove or replace an existing node in intrusive hash table 120. In an embodiment, data management module 104 makes the determination by locating the key associated with the operation in intrusive hash table 120 using next member pointers. If the key can be located in intrusive hash table 120, the operation may remove or replace an existing node. In another embodiment, an operation associated with a node containing a DELETE or UPDATE operation member may remove or replace an existing node in intrusive hash table 120. An INSERT operation may add a node to intrusive hash table 120, but may not affect an existing node in intrusive hash table 120.

In step 712, upon determining the operation removes or replaces an existing node, data management module 104 may create a backlink in intrusive hash table 120. For an operation associated with a DELETE operation, the next pointer member of the existing node in intrusive hash table 120 to be removed is routed to point to the parent node of the existing node to be replaced. For an operation associated with an UPDATE operation, the next pointer member of the existing node in intrusive hash table 120 to be replaced is routed to point to the node associated with the operation. These backlinks may allow subsequent operations to be applied to intrusive hash table 120 correctly. Example mechanisms are described in FIGS. 3A-E.

In step 706, data management module 104 has finished applying the operations of the transaction. In an embodiment, data management module 104 may proceed to step 404 in method 400 where data management module 104 may receive or wait to receive another transaction to process.

Various embodiments can be implemented, for example, using one or more well-known computer systems, such as computer system 800 shown in FIG. 8. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible apparatus or article of manufacture comprising a tangible computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of the invention using data processing devices, computer systems and/or computer architectures other than that shown in FIG. 8. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer implemented method for transaction support through an intrusive hash table, comprising:
   receiving a transaction comprising a plurality of operations that need to be verified before being committed, wherein each of the plurality of operations is associated with a key, an operation type, and a next pointer;
   verifying a validity of the transaction by searching the intrusive hash table and previous operations of the transaction to verify a validity of each operation from the plurality of operations, wherein the intrusive hash table stores a plurality of nodes representing operations of previously-verified transactions, wherein the operation is verified based on looking up the key in the intrusive hash table and searching the plurality of operations for another operation associated with the key and identifying the operation type of the operation;

applying, responsive to verifying the transaction, the transaction to the intrusive hash table; and wherein at least one of the receiving, verifying, and applying are preformed by one or more computers.

2. The method of claim 1, wherein the applying further comprises:
routing next pointers associated with the plurality of operations; and
routing next pointers associated with nodes of the plurality of nodes affected by applying the transaction.

3. The method of claim 1, further comprising:
failing to verify an operation of the plurality of operations in the transaction;
halting, responsive to the failing, verification a unverified operations of the plurality of operations; and
proceeding to receive and process another transaction without undoing verification of previously verified operations.

4. The method of claim 1, wherein the operation type is a selected one of an insert operation, a delete operation, an update operation, and a no-op operation.

5. The method of claim 1, wherein the next pointer is used to cache a result of the looking up.

6. The method of claim 1, wherein verifying the validity of an operation from the plurality of operations further comprises:
identifying the operation is associated with a previously verified operation of the plurality of operations by comparing the key with a previous key of the previously verified operation;
assigning the next pointer to point to the previously verified operation in the intrusive hash table; and
converting the operation and the previously verified operation into two equivalent operations.

7. The method of claim 6, wherein the converting comprises:
assigning an operation type of the at least one of the equivalent operations to a no-op operation type, wherein the at least one of the equivalent operations is not processed.

8. A system, comprising:
a memory storing transactions; and
at least one processor coupled to the memory and configured to:
receive a transaction comprising a plurality of operations that need to be verified before being committed, wherein each of the plurality of operations is associated with a key, an operation type, and a next pointer;
verifying a validity of the transaction by searching the intrusive hash table and previous operations of the transaction to verify a validity of each operation from the plurality of operations, wherein the intrusive hash table stores a plurality of nodes representing operations of previously-verified transactions, wherein the operation is verified based on looking up the key in the intrusive hash table and searching the plurality of operations for another operation associated with the key and identifying the operation type of the operation; and apply, responsive to verifying the transaction, the transaction to the intrusive hash table.

9. The system of claim 8, wherein to apply the transaction the at least one processor is configured to:
routing next pointers associated with the plurality of operations; and
routing next pointers associated with nodes of the plurality of nodes affected by applying the transaction.

10. The system of claim 8, wherein the at least one processor is further configured to:
halt, responsive to the failing to verify an operation of the plurality of operations, the verification of unverified operations of the plurality of operations; and
process another transaction without undoing verification of previously verified operations.

11. The system of claim 8, wherein the operation type is a selected one of an insert operation, a delete operation, an update operation, and a no-op operation.

12. The system of claim 8, wherein the next pointer is used to cache a result of the looking up.

13. The system of claim 8, wherein to verify the validity of an operation from the plurality of operations the at least one processor is further configured to:
identifying the operation is associated with a previously verified operation of the plurality of operations by comparing the key with a previous key of the previously verified operation;
assign the next pointer to point to the previously verified operation in the intrusive hash table; and
convert the operation and the previously verified operation into two equivalent operations.

14. The system of claim 13, wherein to convert the operation and the previously verified operation, the at least one processor is further configured to:
assign an operation type of the at least one of the equivalent operations to a no-op operation type, wherein the at least one of the equivalent operations is not processed.

15. A non-transitory computer-readable device having instructions stored thereon that, when executed by at least one computing device, causes the at least one computing device to perform operations comprising:
receiving a transaction comprising plurality of operations that need to be verified before being committed, wherein each of the plurality of operations is associated with a key, an operation type, and a next pointer;
verifying a validity the transaction by searching the intrusive hash table and previous operations of the transaction to verify a validity of each operation from the plurality of operations, wherein the intrusive hash table stores a plurality of nodes representing operations of previously-verified transactions, wherein the operation is verified based on looking up the key in the intrusive hash table and searching the plurality of operations for another operation associated with the key and identifying the operation type of the operation;
applying, responsive to verifying the transaction, the transaction to the intrusive hash table; and
wherein at least one of the receiving, verifying, and applying are preformed by one or more computers.

16. The computer-readable device of claim 15, the verifying of an operation from the plurality of operations comprises:
identifying the operation is associated with a previously verified operation of the plurality of operations by comparing the key with a previous key of the previously verified operation;

assigning the next pointer to point to the previously verified operation in the intrusive hash table; and converting the operation and the previously verified operation into two equivalent operations, wherein at least one of the equivalent operations is associated with a no-op operation type, and wherein the at least one of the equivalent operations is not processed.

* * * * *